United States Patent
Mattern et al.

(10) Patent No.: US 6,863,538 B2
(45) Date of Patent: Mar. 8, 2005

(54) CONNECTION DEVICE

(75) Inventors: Kirstin Mattern, Echzell (DE); Kurt Rautenberg, Neu-Anspach (DE)

(73) Assignee: Erich Jaeger GmbH + Co. KG, Friedberg (DE)

( * ) Notice: Subject to any disclaimer, the term of this patent is extended or adjusted under 35 U.S.C. 154(b) by 12 days.

(21) Appl. No.: 10/450,776

(22) PCT Filed: Oct. 17, 2002

(86) PCT No.: PCT/EP02/11639

§ 371 (c)(1),
(2), (4) Date: Jun. 18, 2003

(87) PCT Pub. No.: WO03/035415

PCT Pub. Date: May 1, 2003

(65) Prior Publication Data

US 2004/0038557 A1 Feb. 26, 2004

(30) Foreign Application Priority Data

Oct. 20, 2001 (DE) ........................................ 101 51 819

(51) Int. Cl.[7] .............................................. H01R 13/64
(52) U.S. Cl. .......................... 439/35; 439/248; 439/140; 439/310
(58) Field of Search ................................ 439/247, 248, 439/35, 374, 140, 141, 310

(56) References Cited

U.S. PATENT DOCUMENTS

| 3,951,500 | A | * | 4/1976 | Anderson | .................... 439/248 |
| 4,111,452 | A | | 9/1978 | Carlsson | |
| 4,156,551 | A | * | 5/1979 | Nagase et al. | ................. 439/35 |
| 4,580,862 | A | * | 4/1986 | Johnson | ....................... 439/248 |
| 4,697,859 | A | * | 10/1987 | Fisher, Jr. | .................... 439/246 |
| 4,815,986 | A | * | 3/1989 | Dholoo | ........................ 439/248 |
| 5,167,520 | A | * | 12/1992 | Henry et al. | ................. 439/266 |
| 5,458,357 | A | | 10/1995 | Wohlhüter | |
| 5,516,303 | A | * | 5/1996 | Yohn et al. | .................. 439/248 |
| 5,591,040 | A | * | 1/1997 | Dohan et al. | ................ 439/248 |
| 6,224,407 | B1 | | 5/2001 | Duquerroy et al. | |
| 6,354,855 | B2 | * | 3/2002 | Annequin | .................... 439/248 |
| 6,558,177 | B2 | * | 5/2003 | Havener et al. | ............. 439/246 |

FOREIGN PATENT DOCUMENTS

| DE | 30 09 284 | 9/1981 |
| DE | 41 35 795 | 5/1993 |
| FR | 2 669 152 | 5/1992 |
| GB | 2 128 038 | 4/1984 |

* cited by examiner

Primary Examiner—Gary Paumen
(74) Attorney, Agent, or Firm—Wenderoth, Lind & Ponack, L.L.P.

(57) ABSTRACT

A plug-in connection device for the self-actuating electrical connection of a motor vehicle trailer to a towing motor vehicle with a socket (D) and a plug (S), which can be disposed on the motor vehicle trailer (for example the plug S) or the towing motor vehicle (for example socket D) During the coupling of the motor vehicle trailer to the towing motor vehicle, socket (D) and plug (S) can be aligned with respect to one another and can be moved by means of a drive (10), developed for example as a piston-cylinder configuration, relative to one another between an advanced connection position and a retracted resting position. Preferably a cover (5) of the socket (D) can be opened by displacing the contact insert (1), bearing contact sleeves (11, 12), in the direction of the connection position with the aid of drive (10). When the contact insert (1) is retracted into the resting position, the cover can be closed again. The plug (S) is supported such that it is resiliently yielding laterally against the action of a retaining spring (213).

19 Claims, 5 Drawing Sheets

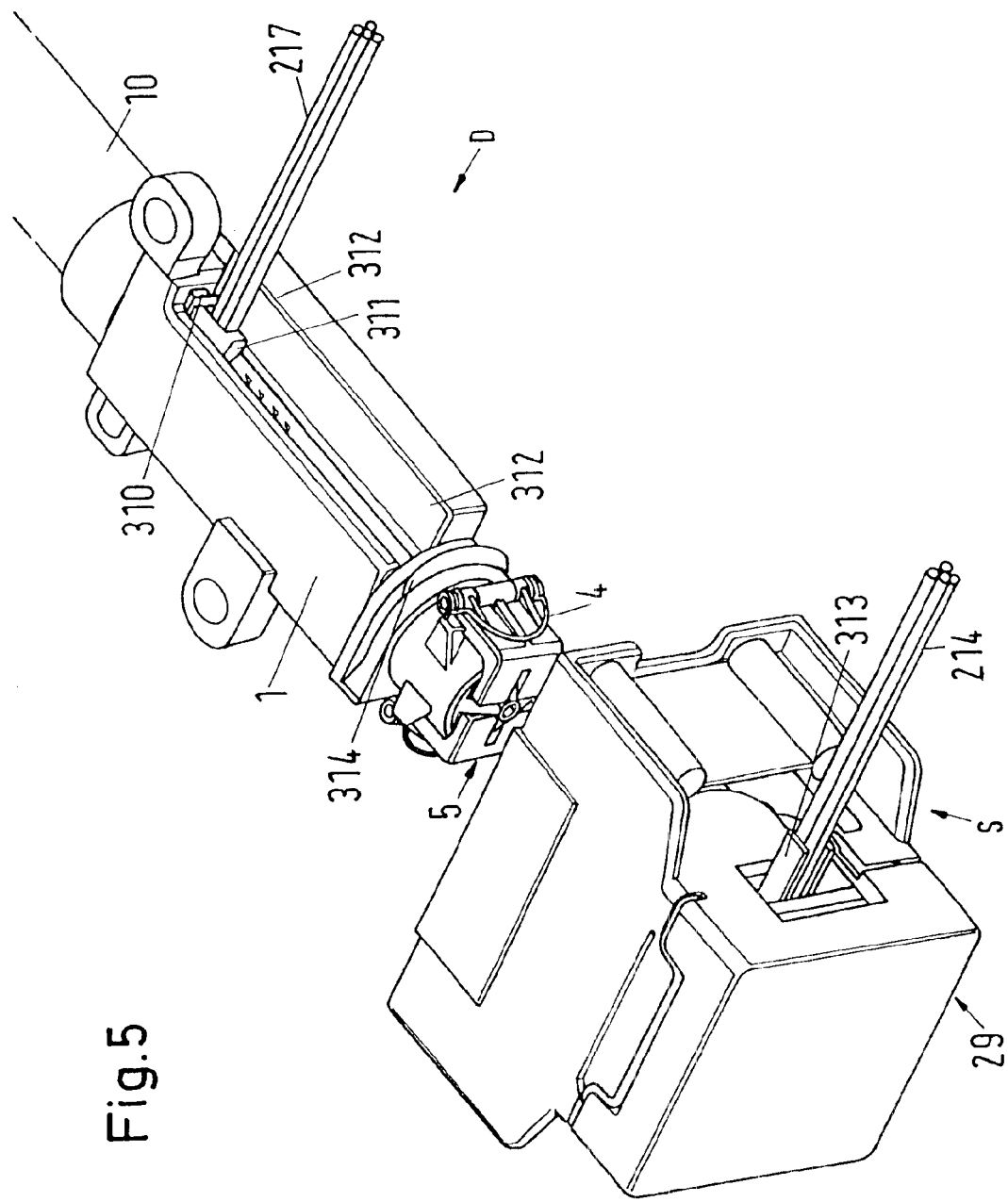

CONNECTION DEVICE

BACKGROUND OF THE INVENTION

The present invention relates to a plug-in connection device for the self-actuating, for example a multipolar, electric connection of a motor vehicle trailer, in particular a semitrailer, to a towing vehicle, in particular a semitrailer tractor, with a socket and a plug, which can be disposed on the motor vehicle trailer (for example the plug) or the towing vehicle (for example the socket), during the coupling of the motor vehicle trailer to the towing vehicle can be aligned with one another and, by means of a drive, developed for example as a piston-cylinder configuration, can be moved under guidance relative to one another between an advanced connection position and a retracted resting position, where preferably a cover of the socket, by shifting the contact insert received in it and bearing the contact sleeves in the direction of the connection position can be opened self-actuatingly with the aid of the drive and, by retracting the contact insert into the resting position, can be closed again.

In such a plug-in connection device, which has already been proposed, the coupling position is to be ensured by a sensory device. Due to the large tolerances customary in motor vehicle construction, and due to the danger of contamination of the sensors during a driving operation, the precise alignment of the plug with respect to the socket, however, is difficult. Self-actuation of the connection process is therefore questionable.

SUMMARY OF THE INVENTION

The present invention addresses the problem of proposing a plug-in connection device of the described type in which, without manual actuation, a high-level and self-actuating position-finding ease of the two plug-in elements with respect to one another is provided.

This problem is essentially solved in a plug-in connection device of the type in which the plug is supported such that it resiliently yields laterally against the action of a retaining spring.

The solution according to the invention ensures that the self-actuating guiding-together of the plug and socket can be readily and reliably accomplished even in the presence of relatively large tolerances or imprecisions of the sensing.

In this context it should be said generally that the terms "socket" and "plug" employed in this specification as the two plug-in elements of a plug-in connection device can also be exchanged with one another, i.e. that those characteristics which in the present context described and represented for a socket or plug, can also be conversely employed in the other of the two plug-in elements. Solely for the purpose of simplifying the description, the terms "socket" and "plug" are also employed in this sense in the following.

In order for the plug to return to the correct starting position after the plug-in connection has been detached, if the plug, due to an imprecision of the leading-in of the socket, has been laterally deflected, the retaining spring for the plug, in a special formation of the invention, is developed such that it encompasses the plug housing as a spring spiral, which preferably tapers forwardly in its diameter.

In a further development of the inventive concept, the posed problem is solved even better if the plug housing comprises an introduction cone for the socket, since with the aid of the same the socket can be reliably inserted into the plug even with deviations of the alignment due to tolerances.

The lateral deflection of the plug can be ensured for example in a simple manner so that the plug housing is supported rearwardly for example via a ball bearing on a retaining plate.

For further tolerance compensation in the axial direction, it is of advantage if according to a further characteristic of the present invention the retaining plate guided on a fastening flange, which also serves as a mounting flange, is supported on a return spring. In this way, lateral swiveling of the plug housing against the action of the return spring, as well as the retaining spring for the plug, is ensured.

To largely prevent the contamination of the contact pins of the plug, but yet to ensure the self-actuating establishment of the plug-in connection, the present invention further proposes that the plug housing, including the contact attachment bearing the contact pins, is closed in the resting position by a cover plate for example behind the introduction cone. The cover plate preferably has penetration openings for the contact pins and is movable, in particular slidable, against the action of a return spring from the forward resting position and the release of the contact pins into a rearward connection position. In this way, the self-actuating opening and closing of the plug housing is accomplished through the insertion and pulling-out of the socket itself. In the resting position, thus when not in use, the contact pins are protected. The disposition is preferably made such that in the resting position of the cover plate the contact pins just close off the penetration openings. For that reason, the contact pins can serve as guidance for the cover plate when it is moved back and forth.

To protect the interior volume of the plug housing, it can further be provided that the cover plate in its resting position is pressed by its return spring on its outer edge, if necessary with the interspacing of a sealing ring, onto an inner shoulder of the plug housing.

The sealing ring can be held on the front end of a spacer sleeve in the plug.

To facilitate the mounting, the return spring for the cover plate, in the form of a spring spiral, can provide the contact attachment and can preferably be received with its rearward end in an annular groove.

According to a further inventive characteristic of the invention, the plug housing is provided with a stopper including a valve core, which in the installed state points downwardly. A baffle plate is provided in the valve core. Accordingly, condensation water can drip off of the battle plate, however, by which the penetration of water (splash water, steam jets) from the outside is prevented.

In order for the plug-in connection to be secured in the connection position, and socket and the socket be reliably held in the resting position, the drive can be latched in the connection position and/or the resting position of the socket.

To simplify the mounting and dismounting, a contact insert can be detachably fastened on the piston of the drive developed for example as a pneumatic piston-cylinder configuration, for example with a machine screw.

In order for the contact sleeves to maintain the correct alignment with respect to the contact pins of the plug, in a further development of the invention, the contact insert of the socket is guided torsion-tight on a base plate serving for example also as a mounting plate.

The base plate can be equipped with a housing portion encompassing the contact insert with ball bodies distributed over its circumference. This permits the contact insert to be held in two defined positions (starting position=unlatched; function position=latched).

The plug-in connection device according to the invention can optionally comprise an emergency release, which in the event of power failure permits the mechanical separation of socket and plug, protection against torsion of the socket, coding protection of the socket, sensors for the position detection of the socket, securement of the plug housing against the lifting from the retaining plate and/or snap-in means of the contact insert in the moved-in and moved-out position to further increase the functional security.

Additional goals, characteristics, advantages and application feasibilities of the present invention are evident based on the following description of an exemplary embodiment taken in conjunction with the drawings. Therein all described and/or graphically represented characteristics by themselves and in any desired combination form the subject matter of the present invention also independently of their combination in individual claims or their reference back.

BRIEF DESCRIPTION OF THE DRAWINGS

FIG. 3a is a side view of the front portion of the socket according to FIG. 3;

FIG. 5 is a perspective view of a different embodiment of the plug-in connection device according to the invention.

DETAILED DESCRIPTION OF THE INVENTION

Figure 1:
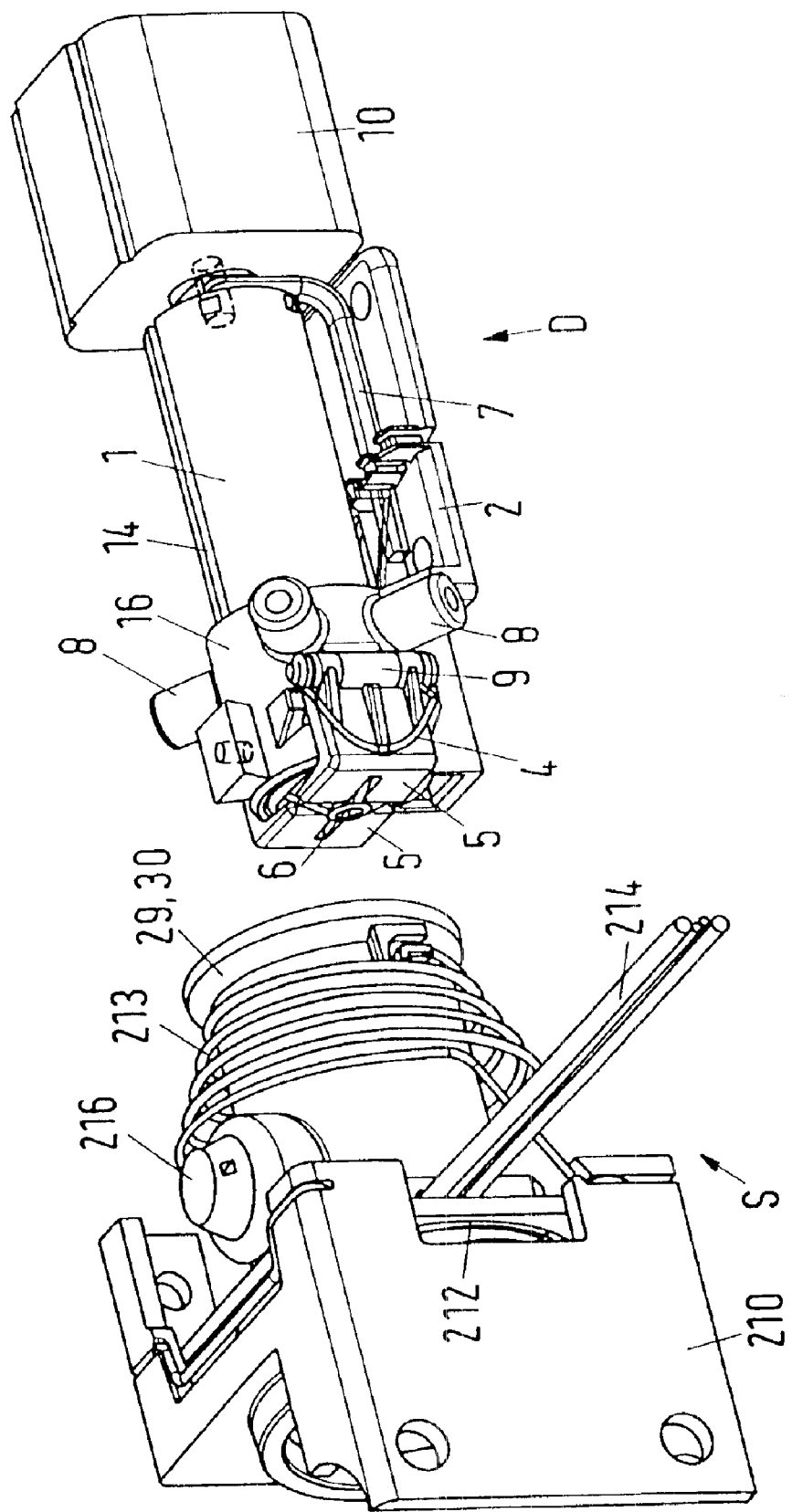
FIG. 1 is a first perspective view of an embodiment of a plug-in connection device according to the invention shortly before the introduction of the socket into the plug.
Figure 2:
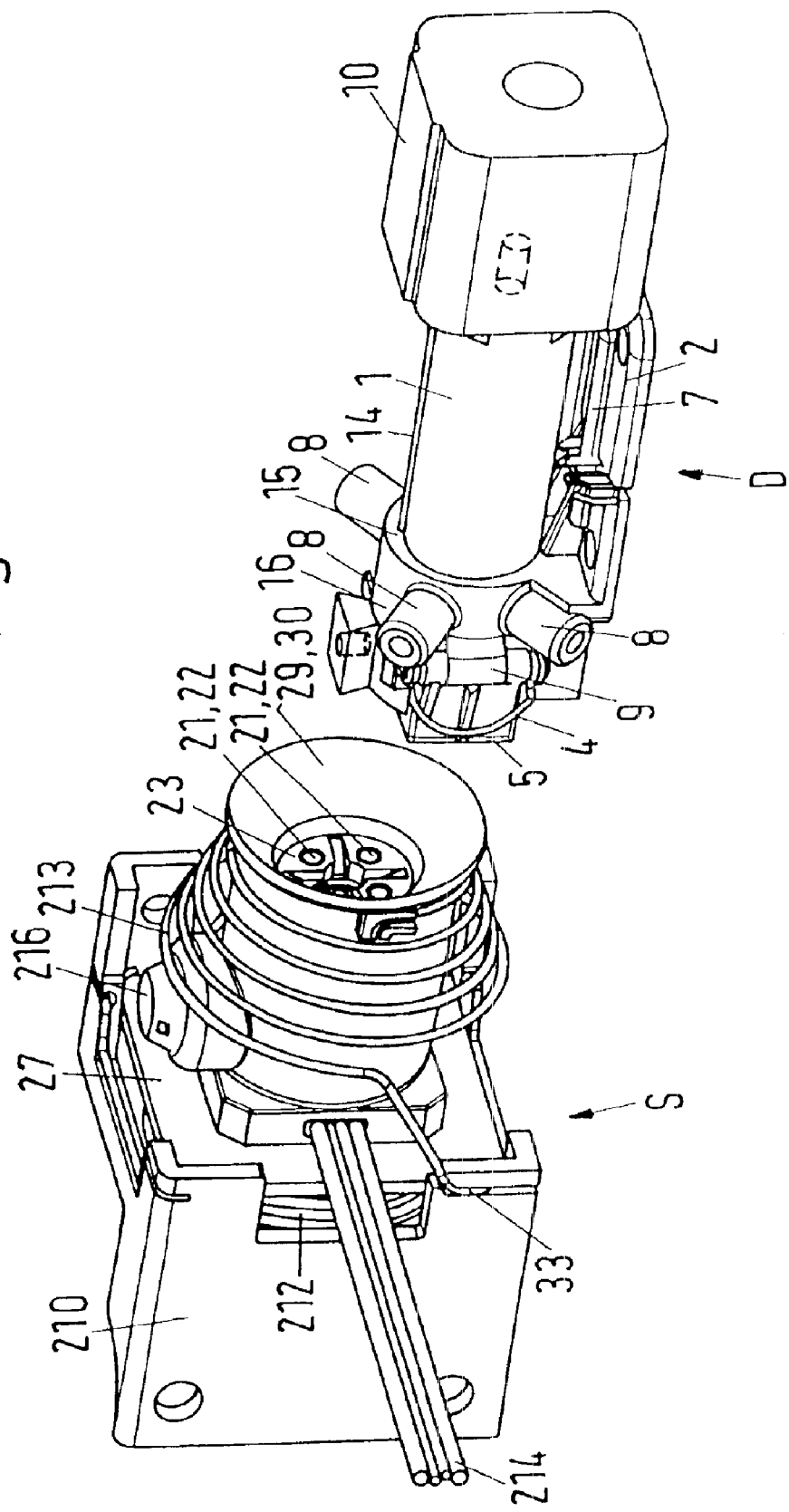
FIG. 2 is a different perspective view of the plug-in connection device according to FIG. 1.

The plug-in connection device depicted in the drawing Figures can be employed for example in a combination semitrailer/semitrailer tractor and subsequently disposed in the region of the semitrailer coupling. The plug-in connection device comprises, for example, a plug to be disposed on the motor vehicle trailer and a socket D to be disposed for example on the towing motor vehicle. When coupling the motor vehicle trailer on the towing motor vehicle, the plug and socket can be aligned with respect to one another self-actuatingly, which largely takes place with the aid of a sensor configuration which detects the position of the motor vehicle trailer relative to the towing motor vehicle. By means of a drive 10, developed as a piston-cylinder configuration, the two plug-in elements D, S are plugged together. The drive 10 is developed such that it can move the socket D from a retracted resting position in which the plug-in connection is not used, into an advanced connection position, in which the plug-in connection is to be established, and the socket D cooperates with plug S. When detaching the plug-in connection the direction of movement of the socket D is reversed.

Figure 3:
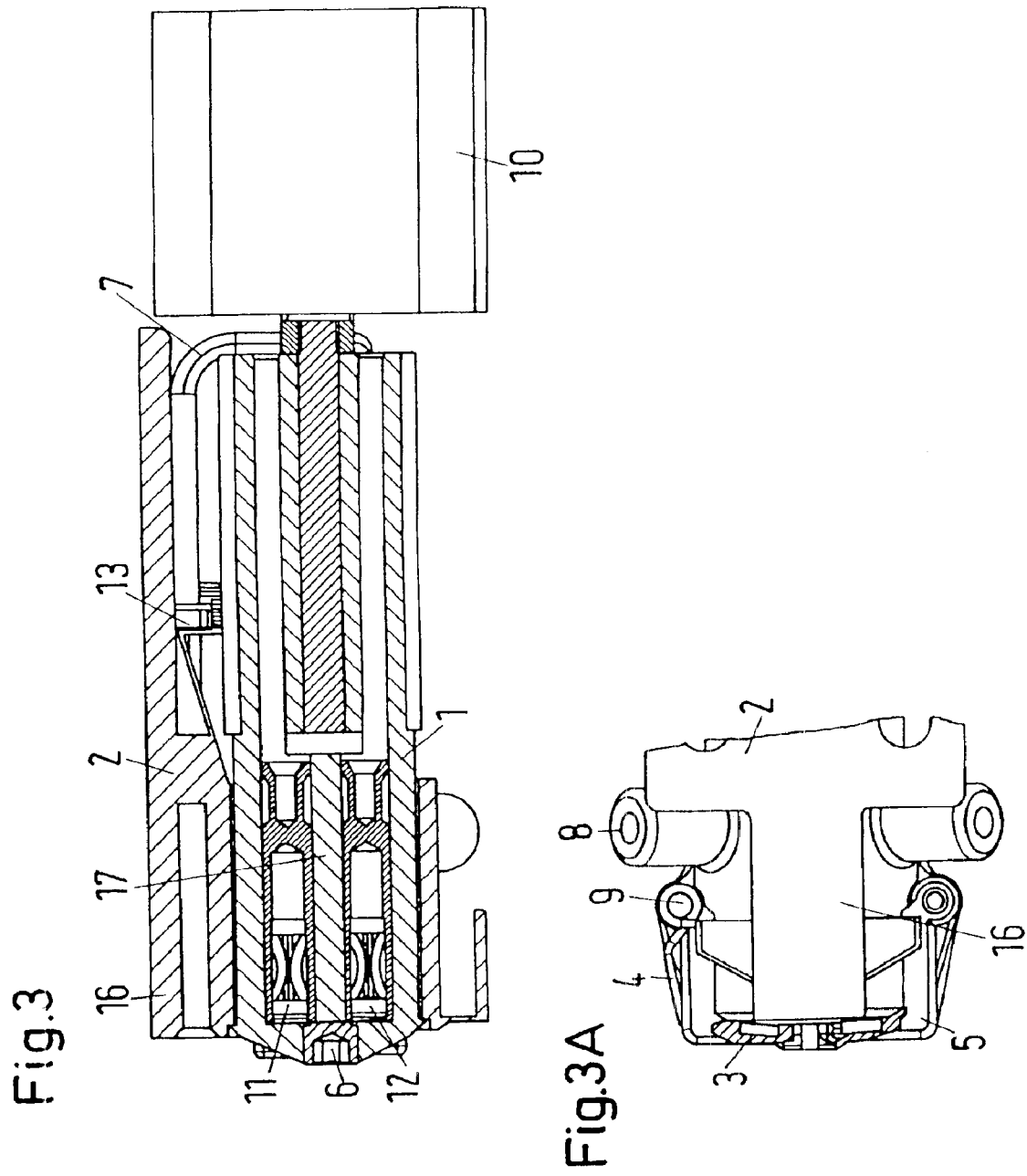
FIG. 3 shows a socket according to the invention in longitudinal section.

As is most clearly evident in FIG. 1 and FIG. 3a, the socket D comprises a cover 5 formed of two flaps. The flaps of cover 5 are pivotably supported on pivot axes 9 of an annular housing portion 16 of a base plate 2 against the action of return springs 4 developed as leg springs, such that when advancing the contact insert guided on the base plate 2 into the connection position, the two flaps of cover 5 always fold toward the outside and, when retracting the contact insert 1 into the retracted resting position, are again brought into their closure position by means of the return springs 4. For secure sealing, the front end of the contact insert 1 or of the housing portion 16 is provided with a sealing washer 3 on which the flaps of cover 5 in the closed position can be applied. A torsion-tight guidance of the contact insert 1 takes place on the housing portion 16 with the aid of an outer longitudinal slot 14 in the shell of the contact insert 1 and an associated inner longitudinal rib 15 of the housing portion 16. The contact insert 1 is detachably fastened with the aid of a socket head machine screw 6 on the front end of piston 17 of the piston-cylinder configuration 10. A cable 7 for supplying the contact insert 1 is molded into the base plate 2 and tension-relieved by means of a clamp 13. The housing portion 16 of the base plate 2 includes radially projecting ball bodies 8, which serve for retaining the contact insert 1 in two defined positions (starting position=unlatched; function position=latched). The ball bodies 8 are distributed over the outer circumference of the housing portion 8.

The drive 10 is latched in the advanced connection position as well as in the retracted resting position of socket D in order to secure socket D in both positions against position changes.

For tolerance compensation of the orientation of the two plug-in elements with respect to each other, the plug S is supported against the action of a retaining spring 213 such that it resiliently yields laterally. The retaining spring 213 for plug S is developed as a spring spiral encompassing the plug housing 29, which, developed as a double-helical spring, is secured with its rearward free ends 33 on a fastening flange 210, which can also serve as a mounting flange. The retaining spring 213 tapers in the forward direction in terms of diameter in order to provide it with the requisite return characteristic.

The plug housing 29 is equipped at its front end with an introduction cone 30 for socket D, in order to compensate alignment tolerances. In addition, the plug housing 29 is supported via ball bearings 26 on a retaining plate 27 in order to permit the lateral yielding against the action of the retaining spring 213.

Figure 4:
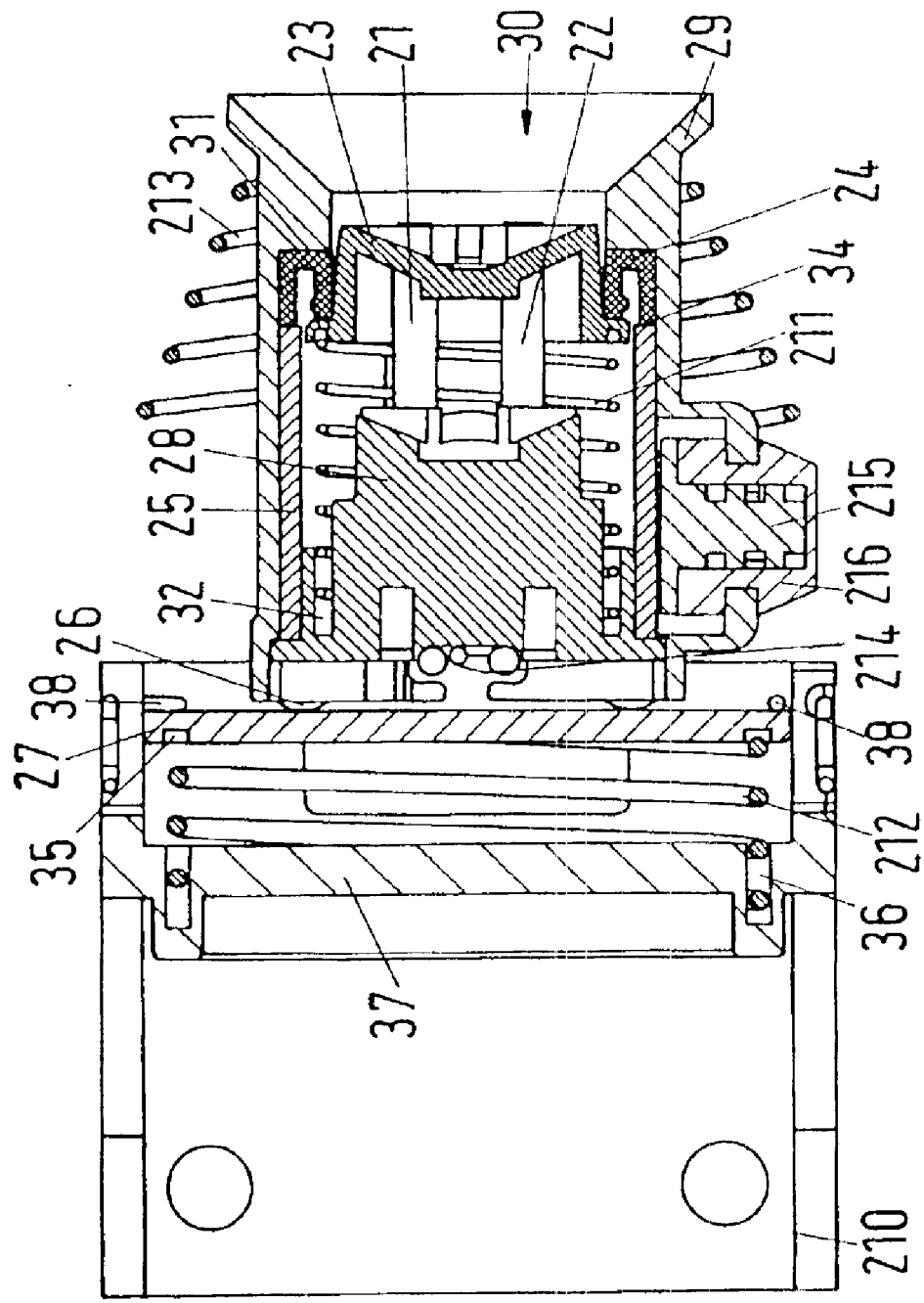
FIG. 4 is a longitudinal sectional view of a plug according to the invention matching the socket according to FIG. 3.

The plug housing 29 receives a contact attachment 28 bearing a contact pin 21, 22. In the resting position depicted in FIG. 4 the plug housing 29 is closed with a cover plate 23, which comprises for example penetration openings for the contact pins 21, 22, which, in the resting position, just closes the penetration openings. The cover plate 23 is pressed by a return spring 211 with an outer collar by interspacing a sealing ring 24 developed as an oil-seal ring onto an inner shoulder 31 of the plug housing 29. The return spring 211 is developed as a spring spiral, which is seated on the contact attachment 28 with its rearward end being held in a circumferential groove 32 of the contact attachment 28. The cover plate 23 is concave at the front and is specifically adapted to receive the convex development of the front end of socket D (see FIG. 3) such that an additional centering for the introduction of socket D into plug S takes place. The sealing ring 24 is retained on the front end of a spacer sleeve 25 in the plug housing 29. The cable 214 for the contact attachment 28 is molded with the contact attachment 28 and the plug housing 29.

The retaining plate 27, on which is supported the plug housing 29 with the contact attachment 28, is axially displaceably supported in a fastening flange 210, which can also serve as a mounting flange, axially against the action of a return spring 212. The plug S can therefore resiliently yield backwardly when the socket is plugged into socket D, in order to compensate for impacts and/or tolerances. The return spring 212 is also developed as a spring spiral, which at its front end is received in an annular groove 35 of the retaining plate 27 and at its rearward end in an annular groove 36 of a stationary transverse plate 37 of the fastening flange 210. In the resting position the retaining plate 27 is at the front in contact with stops 38 of fastening flange 210 under pressure of the return spring 212.

The plug housing 29 is equipped with a stopper 216, includes a valve core and points downwardly in the installed state in order to allow, through a baffle (plate) developed in the valve core, condensation water to drip off, and to prevent the penetration of water (splash water, vapor jets) from the outside.

In the embodiment depicted in FIG. 5 of a plug-in connection device according to the invention, reference is made to the following features: on the contact insert 1 is disposed an emergency release 310, which during a system failure ensures that the components of the plug-in connection device can be mechanically separated from one another. A synthetic material absorber for the outgoing cable 217 serves simultaneously as a protection against torsion and coding protection 311 of socket D. Further, in socket D two sensors 312 are provided to detect the two positions of socket D (retracted and advanced). On plug housing 29 are attached laterally projecting ribs, which serve as lifting securement 313, i.e. as mechanical securement of the plug housing 29 against lifting from the retaining plate, while the socket D is pulled from plug S. Instead of the ball snap-in 8, the snap-in of socket D in the retracted and in the advanced position takes place by means of a snap-in means 313 developed as a spring latch.

LIST OF REFERENCE SYMBOLS

1 Contact insert
2 Base plate
3 Sealing washer for cover 5
4 Return spring (leg springs) for cover 5
5 Cover
6 Socket head machine screw
7 Cable
8 Ball body
9 Pivot axes of cover 5
10 Piston-cylinder configuration (torsion-tight)
11 Contact sleeve
12 Contact sleeve
13 Tension-relief clamp
14 Groove
15 Rib
16 Housing portion
17 Piston
21 Contact pin
22 Contact pin
23 Cover plate
24 Sealing ring
25 Spacer sleeve
26 Ball bearings
27 Retaining plate
28 Contact attachment
29 Plug housing
30 Introduction cone
31 Inner shoulder
32 Annular groove
33 Ends of retaining spring 213
34 Collar
35 Annular groove
36 Annular groove
37 Transverse plate
38 Stops
210 Fastening flange (mounting flange)
211 Return spring for cover plate 23
212 Return spring for retaining plate 27
213 Retaining spring (spring spiral)
214 Cable
215 Valve core
216 Stopper
217 Cable
310 Emergency release
311 Protection against torsion/coding protection
312 Sensors
313 Protection against lifting
314 Snap-in means
D Socket
S Plug

What is claimed is:

1. A plug-in connection device for self-actuating electric connection of a motor vehicle trailer to a towing motor vehicle, the plug-in connection device comprising:

a socket member which can be disposed on one of the motor vehicle trailer or the towing motor vehicle, said socket member comprising a contact insert bearing a plurality of contact sleeves, and a cover that can be opened by displacing the contact insert from a rest position in the direction of a connection position; and a plug member which can be disposed on the other of the motor vehicle trailer or the towing motor vehicle, wherein said plug member is supported such that it can resiliently yield laterally against the action of a retaining spring; and a drive device for effecting relative movement of the socket member and the plug member between the rest position and the connection position, wherein the drive device comprises a piston-cylinder arrangement;

wherein, during the coupling of the motor vehicle trailer to the towing motor vehicle, the socket member and the plug member can be aligned with respect to one another and moved relatively by operation of the drive device.

2. The plug-in connection device as claimed in claim 1, wherein the drive device is connected to the contact insert for moving the contact insert in the direction of the connection position, and, when the contact insert is moved back to the resting position, the cover is closed.

3. The plug-in connection device as claimed in claim 1, wherein the plug member comprises a plug housing, and the retaining spring comprises a spiral spring that encompasses the plug housing.

4. The plug-in connection device as claimed in claim 3, wherein the spiral spring has a diameter that tapers in a forward direction.

5. The plug-in connection device as claimed in claim 3, wherein the plug member comprises a plug housing, and the plug housing has an introduction cone for receiving the socket member.

6. The plug-in connection device as claimed in claim 1, wherein the plug member comprises a plug housing, and the plug housing is supported rearwardly, via ball bearings, on a retaining plate.

7. The plug-in connection device as claimed in claim 6, wherein the plug member includes a fastening flange, and the retaining plate is movably supported on a return spring and movement of the retaining plate is guided by the fastening flange.

8. The plug-in connection device as claimed in claim 1, wherein the plug member comprises a plug housing defining an introduction cone for receiving the socket member, and a contact attachment member disposed rearwardly of the introduction cone and bearing a plurality of contact pins, and a cover plate disposed in the plug housing forward of the contact attachment member in the resting position.

9. The plug-in connection device as claimed in claim 8, wherein the cover plate is disposed rearward of the introduction cone, and the cover plate has a plurality of penetration openings for receiving the contact pins which can be moved against the action of a return spring from the resting position into the connection position.

10. The plug-in connection device as claimed in claim 8, wherein the cover plate, in the resting position, is pressed by a return spring into contact with a sealing ring disposed on an inner shoulder of the plug housing.

11. The plug-in connection device as claimed in claim 10, wherein the sealing ring is held on a forward end of a spacer sleeve disposed in the plug housing.

12. The plug-in connection device as claimed in claim 10, wherein the return spring for the cover plate comprises a spiral spring that encompasses the contact attachment member.

13. The plug-in connection device as claimed in claim 1, wherein the plug housing comprises a stopper including a valve core for allowing condensation water to drip off of the plug housing, and preventing water from entering the plug housing from outside.

14. The plug-in connection device as claimed in claim 1, wherein the drive device, in the connection position and/or the resting position of the socket member, can be latched.

15. The plug-in connection device as claimed in claim 1, wherein the drive device comprises a pneumatic piston-cylinder arrangement, and the contact insert is detachably fastened on the piston of the piston-cylinder arrangement.

16. The plug-in connection device as claimed in claim 1, wherein movement of the contact insert of the socket member is guided torsion-tight on a base plate which also serves as a mounting plate.

17. The plug-in connection device as claimed in claim 16, wherein the base plate includes an annular housing portion that encompasses the contact insert, and the housing portion includes a plurality of ball bodies distributed over a circumference of the housing portion, wherein the ball bodies are adapted to secure the contact insert in two positions.

18. The plug-in connection device as claimed in claim 1, further comprising an emergency release for permitting mechanical separation of the socket member and the plug member during a power failure, a plurality of sensors for detecting the position of the socket member, and snap-in means for securing the socket member the connection position.

19. The plug-in connection device as claimed in claim 1, wherein the socket member comprises a base plate including an annular housing portion, and wherein the cover comprises two flaps that are pivotably supported on the annular housing portion of the base plate, the flaps being resiliently biased by springs to a closed position, and the flaps can be opened against the bias of the springs by displacing the contact insert in the direction of the connection position.

* * * * *